US006569793B2

(12) United States Patent
Hockman et al.

(10) Patent No.: US 6,569,793 B2
(45) Date of Patent: May 27, 2003

(54) FLUIDIZED REACTION OF SYNTHETIC SILICATES

(75) Inventors: John Albert Hockman, Bath, PA (US); Steven Andrew Ciccarelli, Bethlehem, PA (US)

(73) Assignee: Specialty Minerals (Michigan) Inc.

( * ) Notice: Subject to any disclaimer, the term of this patent is extended or adjusted under 35 U.S.C. 154(b) by 102 days.

(21) Appl. No.: 09/792,173

(22) Filed: Feb. 22, 2001

(65) Prior Publication Data

US 2003/0052434 A1 Mar. 20, 2003

(51) Int. Cl.[7] .............................. C03C 3/04; C03C 3/078
(52) U.S. Cl. .............................. 501/29; 501/53; 501/72; 501/133; 106/600; 264/117
(58) Field of Search ........................... 264/117; 501/27, 501/29, 31, 133, 53, 72; 241/170; 106/60

(56) References Cited

U.S. PATENT DOCUMENTS

| 2,366,473 A | * | 1/1945 | Blair ........................... 501/30 |
| 3,907,956 A | * | 9/1975 | Meunier ..................... 264/117 |
| 3,914,364 A | * | 10/1975 | Engelleitner et al. ........ 264/117 |
| 3,956,446 A | * | 5/1976 | Eirich et al. ................. 264/117 |
| 4,252,754 A | * | 2/1981 | Nakaguchi et al. .......... 264/117 |
| 5,500,331 A | | 3/1996 | Czekai et al. |
| 5,513,806 A | | 5/1996 | Falcon-Stewart |
| 5,628,945 A | * | 5/1997 | Riman et al. ................. 264/117 |
| 6,086,242 A | | 7/2000 | Rajamani et al. |
| 6,211,103 B1 | * | 4/2001 | Tomaino et al. ............... 501/29 |
| 6,271,159 B1 | * | 8/2001 | Fairchild et al. ............. 264/117 |
| 6,287,378 B1 | * | 9/2001 | Fairchild et al. ............. 501/133 |
| 6,287,997 B1 | * | 9/2001 | Fairchild et al. ............... 501/29 |
| 6,336,346 B2 | * | 1/2002 | Tomaino et al. ............... 501/29 |

FOREIGN PATENT DOCUMENTS

FR          1376473          3/1972

* cited by examiner

*Primary Examiner*—Stephen J. Lechert, Jr.
(74) *Attorney, Agent, or Firm*—Marvin J. Powell; Michael J. Herman

(57) ABSTRACT

A process is disclosed in which coarse silica, calcium oxides and magnesium oxides are treated in a ball mill together with grinding aids and cold-strength binders. This material is then agglomerated with water to produce a product that reacts at elevated temperatures, e.g. in a fluidized bed reactor, to produce synthetic silicates.

14 Claims, 2 Drawing Sheets

FLUIDIZED REACTION OF SYNTHETIC SILICATES

BACKGROUND

The use of synthetic silicates as precursive materials in ceramic and glass based industries is known. The benefits achieved by prior processes have been realized by the production of synthetic silicate pellets, such as those described in U.S. Ser. No. 08/708,246, now abandoned, 09/001,335, U.S. Pat. No. 6,287,378, and related applications. Such processes utilize a variety of equipment and materials including pan pelletizers, binder materials, coarse silica and catalysts. Although such processes represent progress in the art, they are still subject to problems and limitations. Some of the problems include excessive man power in the operation of pan pelletizers and other equipment, and the use of binders as required materials in the processes, which are based on rotary kilns. Prior processes involve the formation of unreacted masses of raw materials, such as water, silicon oxide, calcium oxide and magnesium oxide sources, which are then reacted to form the desired synthetic silicates. Such unreacted masses, which are termed "green" pellets, may be undried or dried, prior to reaction. Binders are needed to prevent degradation of green pellets when they are subjected to the stresses of a rotary kiln in the temperature ramp-up zone prior to reaction. Additionally, catalysts are required to provide complete and homogeneous reactions when coarser silica is used as a raw material. Thus, improvements in the unit operations and overall processes to produce such synthetic silicate material are needed.

An object of the present invention is to reduce manpower in the operation of the equipment used to produce synthetic silicate material.

Another object of the present invention is to use coarse silica in pin mills.

Yet another object of the present invention is to attain higher degrees of reaction when using silica sand without the use of catalysts.

Yet still another object of the present invention is to prevent the degradation of agglomerates at high temperatures without the use of binders.

These and other objectives are provided by the present invention.

SUMMARY

The present invention is a process for the production of synthetic silicates. The process combines coarse silica, calcium oxides, magnesium oxides, grinding aids and a cold-strength binder in a ball mill, with subsequent agglomeration and reaction to produce the synthetic silicate. Particular advantages are obtained by such process in reduced manpower and binder and catalyst material costs.

EMBODIMENTS OF THE PRESENT INVENTION

Figure 1:
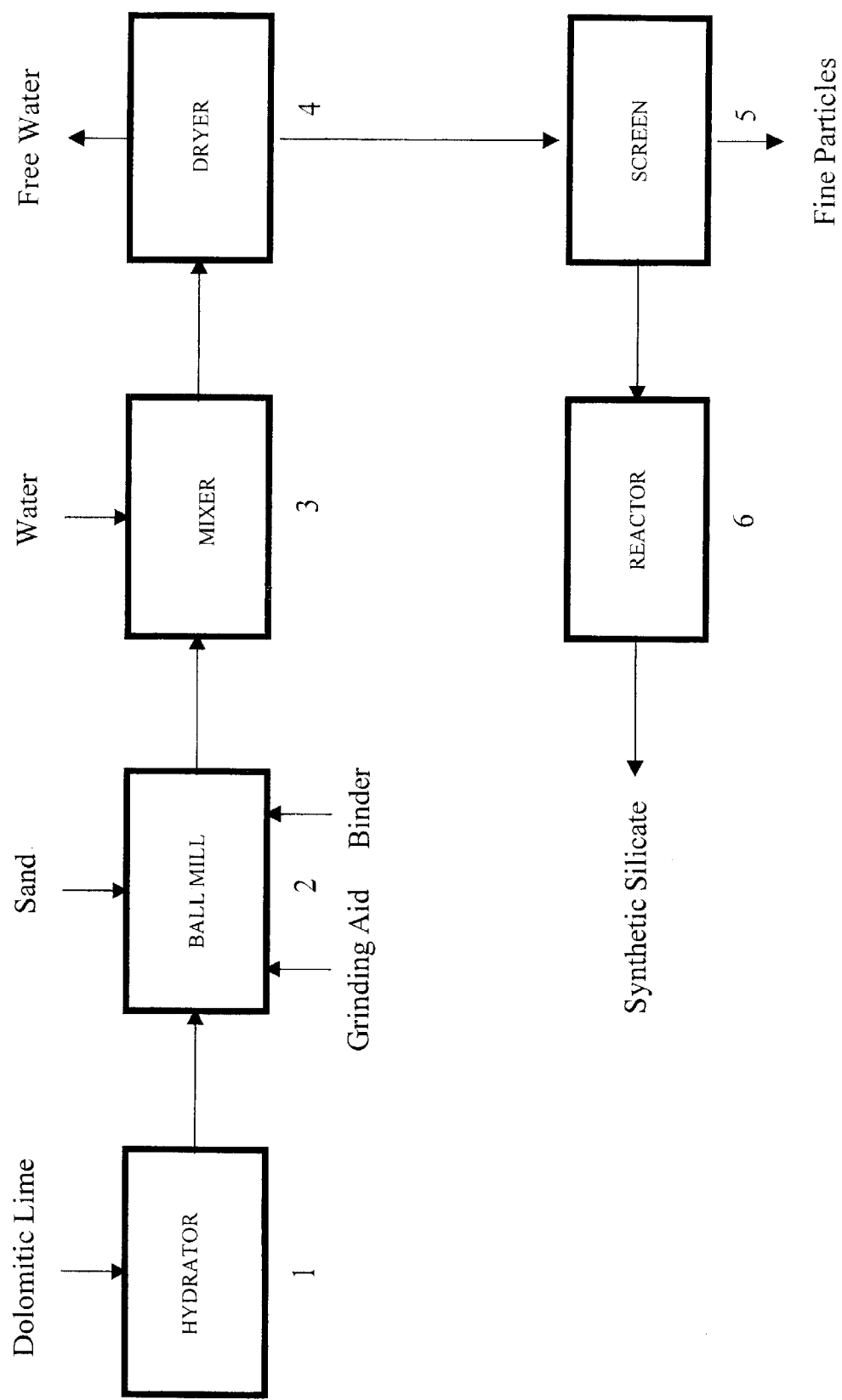
FIG. 1 depicts a general example of the process of the present invention.

One embodiment of the present invention is a process comprising a first step of combining together coarse silica, sources of calcium oxides and magnesium oxides, a grinding aid, and a cold-strength binder in a ball mill; a second step of combining the materials of the first step with water in an agglomerating mixer; and a third step of reacting the material produced by the mixer.

Coarse silica includes sand, preferably at least 90 mass percent of the particles ranging in size from about 100 micrometers to about 1000 micrometers, more preferably ranging from about 150 micrometers to about 600 micrometers and even more preferably ranging from about 250 micrometers to about 600 micrometers. Such sand can be precipitated silicas or natural sand or beneficiated sand and may include contaminants as well, which the artisan may or may not wish to treat or to remove. The particles of such sand can be of a variety of particle size distributions. For instance, the distribution can be at least 80 mass percent of the particles equal to or larger than 250 micrometers, and the balance being smaller than 250 micrometers. Such distribution will vary accorsing to the intended use by the artisan. The particle size distribution can be uni-modal, bi-modal or any other variety of multiple nodes. Additionally, the distribution may have a top or bottom cut-off set.

Various sources of calcium oxides can be used; preferably these are hydrated sources of calcium oxides. Such sources include, but are not limited to dolomitic lime, calcined limestone, or any variety of commercially available sources. Similarly, various sources of magnesium oxides can be used which are preferably hydrated sources of magnesium oxide. Such sources include, but are not limited to, dolomitic lime, magnesium oxide or any variety of commercially available sources. The sources of calcium oxide and magnesium oxide can include, for example, limestone and dolomite. Preferably, the particle size of these materials can range from about 25 micrometers to about 100 micrometers. The degree of hydration of these sources can be 100 mass percent, but can be less as long as sufficient hydration is present to achieve the objects of the present invention.

The grinding aids useable in this invention may assist in maintaining cleanliness of the equipment and facilitate the flow of material through the grinding equipment. Such grinding aids include those which are typical in the art of grinding solid materials in the equipment used in this invention.

The cold strength binder used in this invention can be any suitable binder useable at ambient temperatures. Such binders include, but are not limited to, calcium aluminate cements, caustic magnesia binders, organic binders, such as lignins, and equivalent binders.

The ball mill is operated in a manner such that the exiting material is preferably 80 mass percent finer than about 150 micrometers, more preferably finer than about 75 micrometers. The ball mill is operated to achieve a high degree of homogeneity of the materials fed to the mill. Additionally, the conditions of operation are controlled to obtain an effective enhancement of the surface of the materials as well as control of the reduction of the size of the material for the reaction in the downstream reactor. The enhancement of the surface is such that reaction sites are devoid of, or at least reduced in, contaminants which would hinder the downstream reaction of the materials in the reactor. Such enhancement is preferably performed to a degree such that reduction in the amount of catalysts required for the downstream reaction occurs. Preferably this reduction is at least 50 mass percent, more preferably this reduction is at least 90 mass percent, and even more preferably the requirement of a catalyst is essentially eliminated. Additionally, the ball mill is operated in a manner to produce product of a size and character so as to enhance the feed to the agglomerating mixer. Such enhanced feed should produce agglomerates which are homogeneous such that reaction occurs to a high degree of completion, so that at least 75 mass percent, more preferably at least 85 mass percent of the reactants undergo chemical conversion.

The mixer can be any mixer type suitable for handling the feed material described herein. Such mixer should agglomerate the feed material, which includes the ball mill product and water, into an exit material which is preferably at least 50 mass percent within the range of 1 millimeter to 35 millimeters, more preferably at least 75 mass percent within the range of 1 millimeter to 35 millimeters. A preferred mixer is a pin mill mixer, or a turbulator mixer. The operation of the mixer is controlled by the rates at which water and ball mill product are added, as well as by shaft rotation control, so as to achieve the above stated degrees of agglomeration. The mixer can be operated in conjunction with the ball mill so as to produce a suitable product for the selected reactor equipment. For instance, the degree of agglomeration can be controlled to permit the use of either a rotary kiln or a fluosolids kiln or fluid bed reactor as the reactor equipment. Such use of the combination of the ball mill and mixer, e.g. pin mixer, enables greater control of the reactor feed to a fluidized bed in which silicates are formed without the use of binders. The above described agglomerates which are achieved by this combination will meet the critical size requirements for the successful formation of synthetic silicates in a fluidized bed reactor.

The reactors useable in the present invention can be any high temperature solid state reactors such as, but not limited to, rotary kilns, and fluidized bed reactors. Examples of such reactor can be found in U.S. Pat. Nos. 5,876,679; and 3,904,375, and those references cited therein all of which are incorporated herein by reference. Such fluidized bed reactors have a reaction time significantly less than is typical in rotary kilns. A preferred fluidized bed reactor is one with a ceramic lining. In the present invention such a reactor has the advantage of operating at a cost that is significantly lower than a rotary kiln, at a temperature that is also significantly lower. Such reduced temperatures are possible due to the surface enhancement and other benefits achieved by the combination of the ball mill and the mixer described hereinabove. The combination of ball mill, mixer and fluidized bed reactor allows for higher degree of reaction than previous processes, requires less time and induces less material stress.

One embodiment of the present invention is a process represented by the block diagram depicted in FIG. 1. Dolomitic lime is fed to a hydrator 1 to produce hydrated dolomitic lime. This lime product is then fed to a ball mill 2 to which sand is added along with a cold strength binder and a grinding aid. The ball mill 2 is operated under ambient conditions for a sufficient length of time to achieve a high degree of homogeneity in the mix together with a size reduction of the sand as well as refreshened sand surfaces. The ball mill 2 is operated to produce a product where more than 75 mass percent of the particles exiting the mill have a size less than 75 micrometers. This ball mill product is then fed together with water into a mixer 3 that is operated to produce an agglomerate primarily of a size between 1 millimeter and 35 millimeters, with a water content of about 15 mass percent. This agglomerated material is then fed into a dryer 4 at a sufficient temperature and for a sufficient time to drive off substantially all the free water. The dried agglomerate is then screened through screen 5 to remove fine particles less than 1,000 micrometers. The remaining material is then fed into a reactor 6 operating at a temperature between about 1,250 and 1,350 degrees centigrade. The reaction of the calcium oxide, magnesium oxide and silica material occurs to produce the desired synthetic silicate material. The overflow material is collected from the reactor 6 as product. Optional screening or crushing can be performed after reactor 6.

BRIEF DESCRIPTION OF THE DRAWINGS

Figure 2:
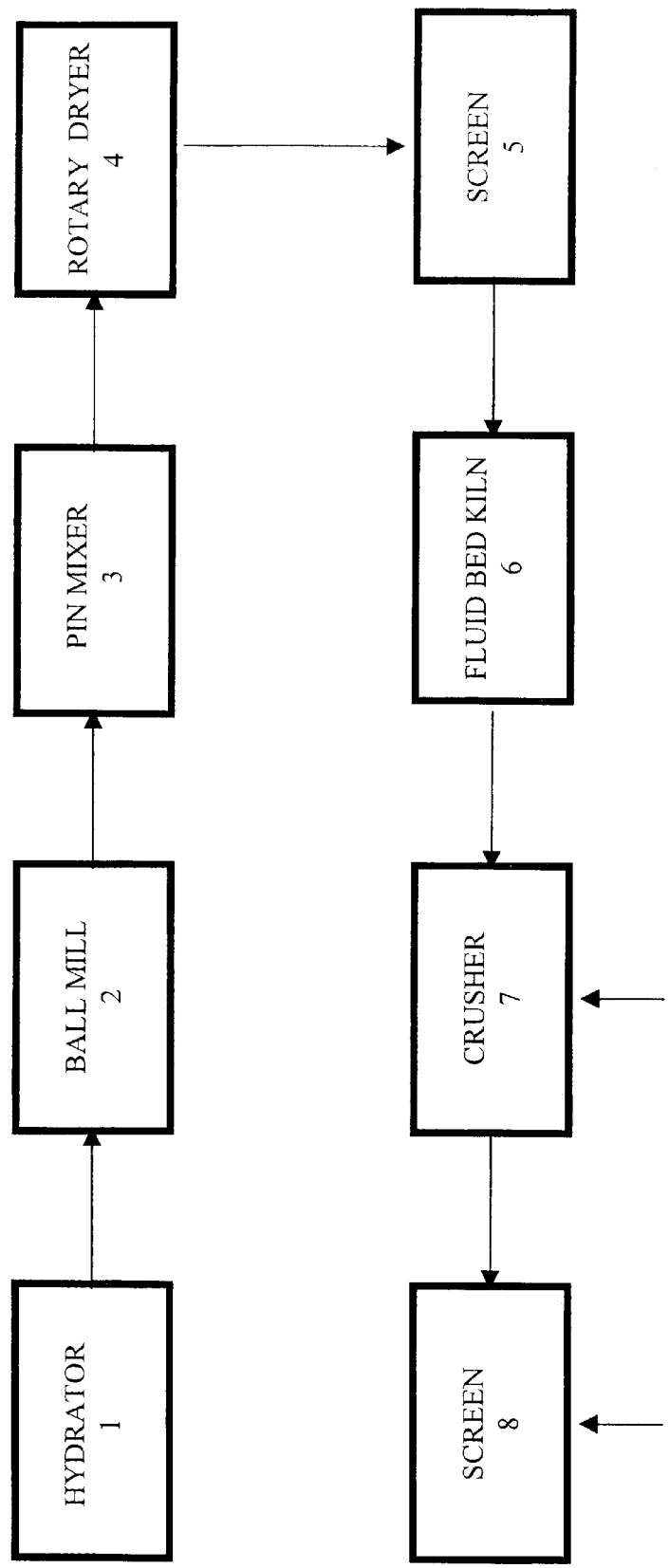
FIG. 2 depicts a specific example of the process of the present invention.

FIGS. 1 and 2 are block diagrams of the process of making synthetic silicate according to the invention.

The following example is intended to illustrate one embodiment of the present invention and is not to be a limitation thereof. Reference to FIG. 2 is made as illustrative of the process exemplified.

A batch is created in hydrator 1 by the addition of 43.25 parts by mass dolomitic lime, 50.95 parts sand, 0.94 parts of a 50 percent solution of caustics, 2.5 parts alumina, and 17.64 parts water, representing the combined water of hydration and the water lost as steam from the hydrator. The components are well mixed and then fed to ball mill 2. Ball mill 2 uses a high chrome media lining and operates in a continuous mode. Sand, binder and grinding aid are added in a continuous process. From the continuous process, a particulate material is produced of which 90 mass percent of the particles have an equivalent spherical diameter of 75 micrometers or less. This material is then fed to a pin mixer 3 to which sufficient water is added such that the product produced contains 17 mass percent moisture. The pin mixer 3 is operated in a continuous process such as to agglomerate the material from the ball mill 3. The agglomerated product of pin mixer 3 is then fed to rotary dryer 4 which is operated at a temperature of 150 degrees centigrade. The agglomerate is dried to a moisture content of less than 1.5 mass percent. The dryer product is fed to screen 5, which is operated such as to remove fines from the product from the rotary dryer 4. The size distribution of the product produced from screen 5 minus such fines results in 9 mass percent being greater than 35 millimeters, 76.5 mass percent being between 600 micrometers and 35 millimeters and 14.5 mass percent being less than 600 micrometers. This screened product is fed to fluid bed kiln 6. The fluid bed is operated at about 1,300 degrees centigrade, and reaction of the agglomerates is sufficient so as to produce a product which has only about 10–15 mass percent unreacted silica.

What is claimed is:

1. A process comprising a first step of admixing coarse silica, sources of calcium oxides and magnesium oxides, a grinding aid, and a cold-strength binder in a ball mill to produce a first admixture; a second step of combining the first admixture and water in an agglomerating mixer to produce a second admixture; and a third step of feeding the second admixture to a reactor and heating to effect a reaction which produces a synthetic silicate.

2. The process of claim 1 wherein the coarse silica is comprised at least 90 percent by weight of sand particles of a size range ranging from about 100 micrometers to about 1000 micrometers.

3. The process of claim 2 wherein the size range of sand particles ranges from about 150 micrometers to about 600 micrometers.

4. The process of claim 3 wherein the sand particles have a distribution in which at least 80 mass percent of particles have equivalent spherical diameters equal to or larger than 250 micrometers, the balance being smaller than 250 micrometers.

5. The process of claim 1 wherein the sources of calcium oxides comprise hydrated calcium oxides.

6. The process of claim 1 wherein the sources of magnesium oxides comprise hydrated magnesium oxides.

7. The process of claim 1 wherein the sources of calcium oxides, or the sources of magnesium oxides, or both, are comprised of particles ranging from about 25 micrometers to about 100 micrometers in size.

8. The process of claim 1 wherein the sources of calcium oxides, or the sources of magnesium oxides, or both, have a degree of hydration of 100 mass percent.

9. The process of claim 1 wherein the cold strength binder is a calcium aluminate cement or a caustic magnesia binder.

10. The process of claim 1 wherein the ball mill is operated in a manner such that 80 mass percent of the material exiting the ball mill is finer than 150 micrometers.

11. The process of claim 1 wherein the ball mill is operated to homogeneity of the materials wherein the surface is devoid of contaminants and to control the reduction of the size of the material for the reaction in the downstream reactor.

12. The process of claim 1 wherein the ball mill is operated in a manner to produce agglomerates which are homogenized to a point where a reaction occurs to a 75 mass percent degree of completion.

13. The process of claim 1 wherein the agglomerating mixer is a pin mill mixer operated such that the ball mill product and water are mixed to produce a particulate material that upon exiting the mixer is at least 50 mass percent of the particles within the range of 1,000 micrometers to 35,000 micrometers.

14. The process of claim 1 wherein the reactor is a fluidized bed reactor.

* * * * *